United States Patent
Turbevillle et al.

(10) Patent No.: US 7,749,376 B2
(45) Date of Patent: Jul. 6, 2010

(54) PROCESS FOR SULFUR ADSORPTION USING COPPER-CONTAINING CATALYST

(75) Inventors: Wayne Turbevillle, Crestwood, KY (US); Nora Yap, Louisville, KY (US); Yeping Cai, Louisville, KY (US); Jürgen Ladebeck, Louisville, KY (US)

(73) Assignee: Sud-Chemie Inc., Louisville, KY (US)

( * ) Notice: Subject to any disclaimer, the term of this patent is extended or adjusted under 35 U.S.C. 154(b) by 911 days.

(21) Appl. No.: 11/203,915

(22) Filed: Aug. 15, 2005

(65) Prior Publication Data

US 2007/0034552 A1   Feb. 15, 2007

(51) Int. Cl.
C10G 29/04 (2006.01)
C10G 29/16 (2006.01)

(52) U.S. Cl. .............. 208/246; 208/247; 208/248; 208/250; 208/299; 502/342; 502/346

(58) Field of Classification Search .............. 208/213, 208/215, 246, 247, 248, 250, 299, 300; 502/342, 502/346

See application file for complete search history.

(56) References Cited

U.S. PATENT DOCUMENTS

| | | | |
|---|---|---|---|
| 4,153,580 A | 5/1979 | Hausberger et al. | |
| 4,279,781 A | 7/1981 | Dienes et al. | |
| 4,459,204 A | 7/1984 | Hecker et al. | |
| 4,596,782 A | 6/1986 | Courty et al. | |
| 5,019,547 A | 5/1991 | Chaumette et al. | |
| 5,128,307 A | 7/1992 | Wanjek et al. | |
| 5,157,201 A | 10/1992 | Norris | |
| 5,245,096 A | 9/1993 | Derouane et al. | |
| 5,360,536 A | 11/1994 | Nemeth et al. | |
| 5,466,720 A | 11/1995 | Fujimoto et al. | |
| 5,990,040 A | 11/1999 | Hu et al. | |
| 6,019,954 A | 2/2000 | Tang et al. | |
| 6,051,163 A | 4/2000 | Kumberger et al. | |
| 6,147,125 A | 11/2000 | Shikada et al. | |
| 6,159,442 A | 12/2000 | Thumm et al. | |
| 6,409,913 B1 | 6/2002 | Clark et al. | |
| 6,576,217 B1 | 6/2003 | Nojima et al. | |
| 6,627,572 B1 * | 9/2003 | Cai et al. | 502/84 |
| 6,693,057 B1 | 2/2004 | Cai et al. | |
| 2002/0051747 A1 | 5/2002 | Suzuki et al. | |
| 2002/0094310 A1 | 7/2002 | Krause et al. | |
| 2007/0167530 A1 | 7/2007 | Gerlach et al. | |

FOREIGN PATENT DOCUMENTS

| | | |
|---|---|---|
| EP | 1174408 A | 1/2002 |
| WO | 03068892 A | 8/2003 |

OTHER PUBLICATIONS

Velu, S., "Selective production of hydrogen by partial oxidation of methanol over catalyst . . . "; Catalysis Letters (1999), 159-167 vol. 62(2-4).
Velu, S., "Selective production of hydrogen for fuel cells via oxidative steam reforming of . . . " Applied Catalysis (2001), 47-63, vol. 213(1).
Velu, S., "Oxidative steam reforming of methanol over CuZnAl(Zr)-oxide catalysts: a new and efficient . . . " Chemical Communications (1999), 2341-2342.
Hilmen, A-M; et al. "Synthesis of higher alcohols on sopper catalysts supported on alkali-promoted . . . " Applied Catalysis A (1998), 355-372 vol. 169(2).
Gines, et al., "Activity and structure sensitivity of the water gas shift reaction over Cu-Zn-Al mixed oxide catalysts," Applied Catalysis A: General, 131 (1995), pp. 283-296.
Gines, et al., "Thermal Decomposition of Cu-based hydroxy carbonate catalytic precursors for the low temperature CO-shift reaction," Journal of Thermal Analysis, vol. 50 (1997), pp. 745-756.

* cited by examiner

*Primary Examiner*—Walter D Griffin
*Assistant Examiner*—Renee Robinson

(57) ABSTRACT

The present invention is a method for the adsorption of sulfur-containing compounds from a hydrocarbon feedstream, and in particular, an olefin feedstream. The method comprises contacting the sulfur-containing compound with a copper oxide/zinc oxide/aluminum oxide catalyst optionally promoted with a metal.

9 Claims, No Drawings

PROCESS FOR SULFUR ADSORPTION USING COPPER-CONTAINING CATALYST

BACKGROUND OF INVENTION

This invention is directed to catalysts and related processes useful for sulfur adsorption from sulfur compound containing feedstreams. Specifically, the invention is directed to copper oxide/zinc oxide/aluminum oxide catalyst optionally promoted with an alkali metal, such as K, Rb, Cs, or with a metal selected from the group consisting of Ti, V, Mn, Zr, Mo, Ru, Rh, Pd, Ba, La, Re, Tl, Ce and combinations thereof, useful for sulfur adsorption processes.

As used herein, the term adsorption shall be defined broadly so as to also include absorption, and no attempt shall be made to distinguish adsorption or adsorptive processes from absorption or absorptive processes.

As part of the pretreatment of naphtha feed streams for catalytic reformers and isomerization units, sulfur guards are commonly used to polish the remaining sulfur species that are present after a hydtrotreater. Guard materials often contain either reduced nickel or copper oxide. Nickel adsorbents are very effective at adsorbing most if not all of the sulfur compounds from the feed stream. Copper containing adsorbents are also effective at taking out sulfur, especially $H_2S$, but are known to allow other sulfur compounds to partially or completely pass through the guard bed, including sulfides and thiophenes. Depending on the catalyst and application, the fact that some sulfur passes through a guard bed may be acceptable since sulfur is often used to moderate the downstream catalyst performance to the desired level. In general, however, thiophenes are less desirable as the sulfur form than, for example, disulfides.

In addition to adsorbents, a number of different catalysts are known in the art that are effective for removing sulfur compounds. For example, activated carbon has a high capacity for ethyl mercaptans, manganese oxide is effective for dimethyl sulfoxide removal, and zinc oxide can be used to remove hydrogen sulfide. Other catalysts known to be effective in desulfurization processes include carbon, copper/zinc oxides, nickel-based sorbents, nickel oxides, zeolites, molecular sieves and faujasites, among others. In addition, different methods have been used to reduce the sulfur level in feedstreams, such as prior art hydrodesulfurization (HDS) processes. These processes are usually carried out at high temperatures and pressures, so they are relatively expensive processes. Further, the HDS processes normally only reduce the sulfur content in gasoline feedstreams to levels of about 200 ppm whereas it is desirable to reduce the sulfur content to about 10 ppm. Thus, a better method for removal of unacceptable sulfur-containing compounds is needed.

SUMMARY OF THE INVENTION

The present invention is a method for the adsorption of sulfur-containing compounds from a hydrocarbon feedstream. The method comprises contacting the sulfur-containing compound with a copper oxide/zinc oxide/aluminum oxide catalyst optionally promoted with an alkali metal, such as K, Rb, Cs, or with a metal selected from the group consisting of Ti, V, Mn, Zr, Mo, Ru, Rh, Pd, Ba, La, Re, Tl, Ce and combinations thereof, wherein the catalyst is prepared from a hydroxycarbonate precursor having from about 1% to about 60% of the catalyst aluminum intercalated in a hydrotalcite, wherein the hydrotalcite is defined as $(Cu,Zn)_6Al_2(OH)_{16}CO_3 \cdot 4H_2O$, and wherein the promoter is applied so as to be accessible at the surface layer of the catalyst.

DETAILED DESCRIPTION OF THE INVENTION

The present development is a process for improved sulfur adsorption using a copper oxide catalyst. The catalyst comprises copper oxide, zinc oxide and alumina, and optionally a promoter selected from the group consisting of Ti, V, Mn, Zr, Mo, Ru, Rh, Pd, Ba, La, Re, Tl, Ce, and an alkali metal, such as K, Rb, Cs, and combinations thereof. The catalyst is produced from a mixed metal hydroxycarbonate precursor having less than about 60% of the aluminum intercalated in hydrotalcite. The resulting catalyst has been surprisingly discovered to be a more effective sulfur adsorbent material than otherwise similar compositions disclosed in the prior art. The catalyst is similar in composition, physical properties and method of preparation as the water gas shift catalyst taught and claimed in U.S. Pat. Nos. 6,627,572 and 6,693,057, which are incorporated herein in their entirety by reference.

Copper oxide/aluminum oxide catalysts and copper oxide/zinc oxide/alumina catalysts made by methods other than taught in the '572 and '057 patents are known in the art for sulfur adsorption. It has been surprisingly discovered herein that the copper oxide/zinc oxide/alumina catalysts made by the method taught in the '572 and '057 patents demonstrate sulfur adsorption at least two times greater than the prior art sulfur adsorbents.

The catalysts that perform as anticipated can be prepared with up to about 90% of the aluminum intercalated in hydrotalcite. In an exemplary embodiment, without limitation, from about 1% to about 60% of the aluminum is intercalated in hydrotalcite, and preferably from about 5% to about 45% of the aluminum is intercalated in hydrotalcite. For this invention, the term "hydrotalcite" is limited to ternary mixtures of copper, zinc and aluminum with the general structure of $(Cu,Zn)_6Al_2(OH)_{16}CO_3 \cdot 4H_2O$. For this invention, the term "hydrotalcite aluminum" or "HTAl" refers to the concentration of aluminum that is present in the precursor in the form of hydrotalcite divided by the total aluminum concentration of the catalyst. To prepare the desulfurization catalyst, appropriate quantities of copper salts and zinc salts are mixed with an aluminum component in an aqueous solution to produce a catalyst precursor mixture, as taught in the '572 and '057 patents.

The catalyst may be formed into any conventional product shape, such as a tablet. Preferred methods for the preparation of the catalyst shape include pelletizing or other conventional molding processes to produce catalysts, especially in the form of spheres, pellets, rings, tablets or extruded products formed mostly of solid or hollow objects in order to achieve high geometric surface with simultaneously low resistance to flow.

The chemical composition of the catalyst before reductive activation, expressed by weight percentage based on dry weight (no volatile content) after calcination is from about 5% to 70% copper oxide, from about 20% to 50% zinc oxide, and from about 5% to about 50% aluminum oxides. Alternatively, more preferred ranges for the materials are: the copper oxide may be present at from about 30% to about 60%, the zinc oxide at from about 20% to about 50%, and the aluminum oxide at from about 5% to about 20%.

The catalyst produced by the process as taught in the '572 and '057 patents has a surface area of from about 40 $m^2/g$ to about 200 $m^2/g$, a copper surface area of greater than about 15 $m^2/g$, and a pore volume of from about 0.2 cc/g to about 0.4 cc/g. Optionally, the catalyst may further comprise from about 50 ppm to about 20 wt % promoter, wherein said promoter is selected from the group consisting of potassium, cesium, rubinium, titanium, zirconium, manganese, vanadium, molybdenum, ruthenium, rhodium, palladium, barium, lanthanum, rhenium, thallium, cerium, a Group I metal, a Group IV-B metal and combinations thereof.

It has been discovered that catalysts prepared according the '572 and '057 patents demonstrate sulfur-trapping behavior. These catalysts are particularly effective sulfur traps when the catalyst bed is held at a temperature of from about 300° F. up to about 375° F., but are also effective at temperatures as low as about 250° F.

The process for sulfur adsorption involves contacting a sulfur-containing feedstream with the catalyst at a temperature of from about 250° F. up to about 375° F. while maintaining a pressure of from about 50 psig to about 250 psig, and preferably at about 150 psig. The feed rate may vary, and in an exemplary run the LHSV (liquid-hourly space velocity) is from about 1 per hour to about 10 per hour, and preferably from about 4 per hour to about 5 per hour.

The following information is presented for example only, and is not intended to be limiting in any way: The catalysts used in examples 1-7 are specified in Table I below. The physical properties of each Example catalyst is provided in Table II.

Catalysts 1-7 are evaluated for sulfur trapping using accelerated performance testing procedures. A dual fixed bed unit with temperatures of about 300° F., pressure of about 150 psig, LHSV of about 5 $hr^{-1}$ is provided with a feed stream of naptha having about 200 ppm by weight sulfur in the form of butanethiol. Breakthrough is defined as 80% sulfur detected in feed exiting the fixed bed. The hours on stream and breakthrough time for each Example Catalyst is provided in Table III. The total sulfur pickup at breakthrough is calculated based on the total hours on stream.

TABLE III

| | | | | Analytical data at HOS | | Calculated data | | | |
| | | | | | | at HOS | | at BT | |
| Example | Time on Stream (hrs) | Breakthrough Time, BT (hrs) | S balance (%) | Total S pickup (mg) | Total % S pickup (%) | Total S pickup (mg) | Total % S pickup (%) | Total S pickup (mg) | Total % S pickup (%) |
| --- | --- | --- | --- | --- | --- | --- | --- | --- | --- |
| 1 | 98 | 66 | 98 | 549.6 | 4.8 | 540.7 | 4.5 | 442.9 | 3.7 |
| 2 | 193 | 185 | 110 | 1278.4 | 5.2 | 1389.9 | 5.6 | 1387.2 | 5.6 |
| 3 | 214 | 209 | 114 | 1630.0 | 9.6 | 1860.8 | 10.1 | 1845.7 | 10.0 |
| 4 | 193 | 139 | 142 | 697.2 | 3.4 | 987.6 | 4.8 | 933.1 | 4.5 |
| 5 | 193 | 139 | 143 | 1032.8 | 5.7 | 1475.8 | 7.7 | 1397.0 | 7.2 |
| 6 | 309 | 289 | 111 | 1312.9 | 5.1 | 1455.2 | 5.7 | 1388.0 | 5.4 |
| 7 | 290 | 260 | 105 | 1386.0 | 7.1 | 1460.0 | 8.4 | 1385.0 | 7.9 |

The efficiency of these reactions seems to be dependent on the total and copper specific surface areas of the catalyst used. This is especially true for highly dispersed copper on CuO/ZnO/alumina materials.

The principals, preferred embodiments and modes of operation of the present invention have been described in the foregoing specification. The invention which is intended to be protected herein, however, is not to be construed or limited to the particular terms of disclosure, as these are to be regarded as being illustrative rather than restrictive. Variations and changes may be made by those skilled in the art without departing from the spirit of the invention.

TABLE I

| Example | Catalyst Type | Carrier | Form | Cu wt % | Cu/Zn Ratio |
| --- | --- | --- | --- | --- | --- |
| 1 | CuO | $Al_2O_3$ | 1/8" extrudate | 20.4 | — |
| 2 | CuO/ZnO | $Al_2O_3$ | 1/16" extrudate | 41.0 | 1.99/1 |
| 3 | CuO/ZnO | $Al_2O_3$ | tablets | 38.5 | 1.89/1 |
| 4 | CuO/ZnO | $Al_2O_3$ | tablets | 32.3 | 0.93/1 |
| 5 | CuO/ZnO | $Al_2O_3$ | tablets | 42.5 | 2.35/1 |
| 6 | CuO/Mn | $Al_2O_3$ | tablets | 42.2 | — |
| 7 | CuO/ZnO/Mn | $Al_2O_3$ | tablets | 30.3 | 0.78/1 |

TABLE II

| Example | CBD (g/cc) | Packing density[a] (g/cc) | Cu surface area ($m^2/g$) | BET-surface area ($m^2/g$) | Mercury pore volume (cc/g) | Mean pore diameter (nm) |
| --- | --- | --- | --- | --- | --- | --- |
| 1 | 0.73 | 0.57 | 2.0 | 178.4 | 0.626 | 14.0 |
| 2 | 1.30 | 1.22 | 5.6 | 61.0 | 0.216 | 15.0 |
| 3 | 1.12 | 0.93 | 19 | 95.5 | 0.302 | 12.6 |
| 4 | 1.29 | 1.03 | 5.1 | 45.7 | 0.255 | 23.3 |
| 5 | 1.20 | 0.96 | 20 | 81.6 | 0.329 | 15.0 |
| 6 | 1.73 | 1.28 | 7.1 | 78.7 | 0.158 | 14.7 |
| 7 | 1.07 | 0.87 | 13.6 | 57.7 | 0.338 | 16.5 |

[a] Sized 16 × 20

The invention claimed is:

1. A process for the adsorption of sulfur from a liquid hydrocarbon feed stream comprising:
   preparing an adsorbent from a mixed metal hydroxycarbonate precursor that includes copper, zinc and aluminum such that about 1% to about 60% of the aluminum is intercalated in a hydrotalcite, wherein the hydrotalcite is defined as $(Cu,Zn)_6Al_2(OH)_{16}CO_3 \cdot 4H_2O$, the adsorbent comprises about 30 wt % to about 60 wt % copper oxide, about 20 wt % to about 50 wt % zinc oxide, and about 5 wt % to about 50 wt % aluminum oxide, and the adsorbent has a copper surface area of at least about 15 $m^2/g$; and
   contacting the adsorbent with a liquid hydrocarbon feed stream at a temperature of about 300° F., at a pressure of about 50 psig to about 250 psig, and at a Liquid Hourly Space Velocity (LHSV) of about 1 per hour to about 10 per hour, wherein the liquid hydrocarbon feed stream includes one or more sulfur compounds and the adsorbent adsorbs the sulfur compounds in the liquid hydrocarbon feed stream.

2. The process of claim 1 wherein about 5 wt % to about 45 wt % of the aluminum is intercalated in hydrotalcite in the adsorbent precursor.

3. The process of claim 1 wherein the adsorbent is contacted with the liquid hydrocarbon feed stream at a LHSV of about 4 per hour to about 5 per hour.

4. The process of claim 1 wherein the adsorbent further comprises from about 50 ppm to about 20 wt % of a promoter, wherein the promoter is selected from the group consisting of potassium, cesium, rubidium, titanium, zirconium, manganese, vanadium, molybdenum, ruthenium, rhodium, palladium, barium, lanthanum, rhenium, thallium, cerium, a Group I metal, a Group IV-B metal and combinations thereof.

5. The process of claim 4 wherein the adsorbent comprises about 50 ppm to about 2.0 wt % of the promoter.

6. The process of claim 1 wherein the adsorbent defines a surface area and the surface area is about 40 $m^2/g$ to about 200 $m^2/g$.

7. The process of claim 1 wherein the adsorbent defines a pore volume and the pore volume is about 0.2 cc/g to about 0.4 cc/g.

8. A process for the adsorption of sulfur from a liquid hydrocarbon feed stream comprising:
   preparing an adsorbent from a mixed metal hydroxycarbonate precursor that includes copper, zinc and aluminum such that about 1% to about 60% of the aluminum is intercalated in a hydrotalcite, wherein the hydrotalcite is defined as $(Cu,Zn)_6Al_2(OH)_{16}CO_3.4H_2O$, the adsorbent comprises about 48 wt % to about 54 wt % copper oxide, about 22 wt % to about 26 wt % zinc oxide, and about 24 wt % to about 27 wt % aluminum oxide, and the adsorbent has a copper surface area of at least about 15 $m^2/g$; and
   contacting the adsorbent with a liquid hydrocarbon feed stream at a temperature of about 250° F. to about 375° F., at a pressure of about 50 psig to about 250 psig, and at a Liquid Hourly Space Velocity (LHSV) of about 1 per hour to about 10 per hour, wherein the liquid hydrocarbon feed stream includes one or more sulfur compounds and the adsorbent adsorbs the sulfur compounds for a minimum of about 139 hours while being contacted with the liquid hydrocarbon feed stream before a breakthrough concentration equal to about 80% of an initial concentration of the sulfur compounds is measured at an outlet of the adsorbent.

9. A process for the adsorption of sulfur from a liquid hydrocarbon feed stream comprising:
   preparing an adsorbent from a mixed metal hydroxycarbonate precursor that includes copper, zinc and aluminum such that about 1% to about 60% of the aluminum is intercalated in a hydrotalcite, wherein the hydrotalcite is defined as $(Cu,Zn)_6Al_2(OH)_6CO_3.4H_2O$, the adsorbent comprises about 48 wt % to about 54 wt % copper oxide, about 22 wt % to about 26 wt % zinc oxide, and about 24 wt % to about 27 wt % aluminum oxide, and the adsorbent has a copper surface area of at least about 15 $m^2/g$; and
   contacting the adsorbent with a liquid hydrocarbon feed stream at a temperature of about 250° F. to about 375° F., at a pressure of about 50 psig to about 250 psig, and at a Liquid Hourly Space Velocity (LHSV) of about 1 per hour to about 10 per hour, wherein the liquid hydrocarbon feed includes one or more sulfur compounds and the adsorbent adsorbs the sulfur compounds to achieve a minimum of about 5.7 wt % total sulfur pickup.

* * * * *